(12) United States Patent
Wiesheu

(10) Patent No.: US 7,220,504 B2
(45) Date of Patent: May 22, 2007

(54) GAS GENERATION SYSTEM WITH PRESSURIZED REACTANT RESERVOIRS

(75) Inventor: Norbert Wiesheu, Guenzburg (DE)

(73) Assignee: DaimlerChrysler AG, Stuttgart (DE)

( * ) Notice: Subject to any disclaimer, the term of this patent is extended or adjusted under 35 U.S.C. 154(b) by 572 days.

(21) Appl. No.: 10/274,229

(22) Filed: Oct. 18, 2002

(65) Prior Publication Data

US 2003/0082418 A1 May 1, 2003

(30) Foreign Application Priority Data

Oct. 25, 2001 (DE) ................ 101 52 836

(51) Int. Cl.
*H01M 8/04* (2006.01)
*B01J 3/00* (2006.01)
(52) U.S. Cl. ........................ 429/17; 422/129
(58) Field of Classification Search ................ 429/17; 422/129, 187, 242; 423/650
See application file for complete search history.

(56) References Cited

U.S. PATENT DOCUMENTS

| | | | |
|---|---|---|---|
| 4,157,270 A * | 6/1979 | Martignoni et al. ..... | 149/109.6 |
| 4,657,828 A * | 4/1987 | Tajima .................. | 429/12 |
| 4,973,528 A * | 11/1990 | Sanderson ............. | 429/12 |
| 5,045,414 A | 9/1991 | Bushnell et al. ......... | 429/17 |
| 5,248,566 A | 9/1993 | Kumar et al. ........... | 429/19 |
| 5,766,786 A | 6/1998 | Fleck et al. ............. | 429/17 |
| 6,355,367 B1 * | 3/2002 | Autenrieth et al. ...... | 429/17 |
| 6,541,143 B2 * | 4/2003 | Herdeg et al. .......... | 429/19 |
| 2001/0010874 A1 * | 8/2001 | Herdeg et al. .......... | 429/19 |

FOREIGN PATENT DOCUMENTS

| | | |
|---|---|---|
| DE | 2136188 | 2/1973 |
| DE | 4103529 | 8/1992 |
| DE | 4425634 | 10/1995 |
| DE | 19909145 | 9/2000 |
| DE | 100 15 331 | 10/2001 |
| EP | 0642184 | 5/1997 |
| EP | 1033770 | 9/2000 |

* cited by examiner

*Primary Examiner*—Gregg Cantelmo
(74) *Attorney, Agent, or Firm*—Davidson, Davidson & Kappel, LLC

(57) ABSTRACT

A gas generation system includes a reservoir for a reactant, a compressor configured to pressurize the reactant in the reservoir using an operating medium delivered into the reservoir, a gas generation component fed with the reactant using a reactant feed line, and a metering element disposed in the reactant feed line between the reservoir and the gas generation component. In addition, a method for operating a gas generation system includes controlling the delivery of compressed operating medium so as to maintain a pressure in the reservoir at a level corresponding to a pressure of the reactant downstream of the reservoir and metering the reactant in a feed line between the reservoir and the gas generation component.

17 Claims, 4 Drawing Sheets

GAS GENERATION SYSTEM WITH PRESSURIZED REACTANT RESERVOIRS

CROSS-REFERENCE TO RELATED APPLICATIONS

This application claims priority to German Patent Application No. 101 52 836.1, filed Oct. 25, 2001, which is incorporated by reference herein.

BACKGROUND

The present invention relates to a gas generation system, including at least one reservoir for a reactant which participates in the gas generation, including at least one compressor for pressurizing the reactant in the reservoir via an operating medium which is delivered into the reservoir, including at least one gas generation component which is fed with the reactants via feed lines, and including at least one metering element located in the feed line between the reservoir and the gas generation component.

A gas generation system of that kind is known from German Published Patent Application No. 199 09 145. This patent application describes a system for pressurizing reactants of a gas generation system that is designed for low-pressure systems. Here, the reactants are each stored in a reservoir before they are fed to the gas generation component. The reactants stored in the reservoirs are pressurized using a pump which is connected to the reservoirs via a pipe system. To this end, the pump delivers an operating medium into the reservoirs. Due to this pressurization, the reactants are delivered into the gas generation component. The metering of the reactants is carried out via metering valves located in the feed lines between the reservoirs and the gas generation component.

SUMMARY OF THE INVENTION

The present invention proposes a gas generation system of the type mentioned at the outset which is also suitable for use within the framework of high-pressure systems in which the system pressure is greater than 10 bar.

The present inventions provides a gas generation system including at least one reservoir for a reactant which participates in the gas generation, and including at least one compressor for pressurizing the reactant in the reservoir via an operating medium which is delivered into the reservoir. The gas generation system also includes at least one gas generation component which is fed with the reactants via feed lines, and at least one metering element located in the feed line between the reservoir and the gas generation component. The metering element allows additional pressurization of the reactant.

According to the present invention, the gas generation system includes a metering element, preferably a metering pump which allows additional pressurization of the reactant.

For instance, in fuel cells using $H_2$ separation membranes, the system pressure is generally above 10 bar. The reactants can only be delivered into the gas generation component of such a fuel cell system if a sufficient pressure gradient relative to the system pressure exists. According to the present invention, it is now proposed to build up a corresponding pressure gradient by pressurizing the reservoirs and with aid of metering pumps downstream of the reservoirs. In this context, it turns out to be advantageous for the pressurization of the reservoirs to be controlled in such a manner that the system pressure is present in the reservoirs.

In fact, the pressure gradient required for delivering the reactants can then be built up particularly easily using standard pumps having a maximum pressure stroke of 10 bar. The energy expenditure required for metering the reactants is relatively small here.

The operation of the compressor generally involves the generation of noise, which is unpleasant for the user. To be able to do without continues operation of the compressor, at least one pressure accumulator for the operating medium is connected downstream of the compressor in an advantageous variant of the gas generation system according to the present invention. In this manner, the reservoirs can also be pressurized when the compressor is turned off provided that the pressure accumulator is under sufficient pressure. In this case, the compressor is switched on only when the pressure in the pressure accumulator falls below a predetermined minimum pressure which should not be smaller than the system pressure. The compressor is switched off when a predetermined maximum pressure is reached in the pressure accumulator. If metering pumps for the reactants are connected downstream of the reservoirs, then the pressure fluctuations caused by the pressure accumulator can be compensated for by appropriate control of the metering pumps. However, the reactants can also be metered using nozzles which are connected downstream of the reservoirs. Nozzles which turn out to be particularly suitable in this context are those having an essentially steady-state characteristic at least in the pressure range of the pressure accumulator so that the volume flow throughput is essentially constant at least in this pressure range.

As already mentioned, the gas generation system can also include several reservoirs for the different reactants involved in the gas generation. In a variant, which is advantageous because it is inexpensive, one compressor is used to pressurize several reservoirs. The use of several compressors is always recommended when the reservoirs have to be maintained at different pressure levels.

To prevent the operating medium and the reactants from mixing, that is, to ensure the separation of operating medium and reactant in a reservoir, movable separator, in particular, a rolling diaphragm, are arranged in the reservoirs in an advantageous variant of the gas generation system according to the present invention.

Using a non-return valve located in the supply path of the operating medium, i.e., between the compressor and the reservoir of the gas generation system according to the present invention, the pressure that has once built up in the reservoir can easily be maintained. The non-return valve is advantageously designed as an emergency valve so that the pressure can be relieved from the reservoir at least in case of an emergency.

In a particularly advantageous variant of the gas generation system according to the present invention, a reactant which participates in the gas generation is used as the operating medium, that is, for pressurizing the reservoirs. In this case, the gas generation system includes at least one further feed line for the operating medium from the compressor to the gas generation component.

The pressurization of the reservoirs is preferably accomplished using a gaseous operating medium. Since inert gases such as nitrogen do not react with the reactants in the reservoirs, they are well suited as operating medium.

If the gas generation system according to the present invention is employed within the framework of a fuel cell system, it is particularly advantageous to use air as the operating medium since air is also involved in the gas generation as a reactant. In this case, as already mentioned, the pressurization of the reservoirs is controlled in such a manner that the system pressure of the fuel cell system is present in the reservoirs. For that purpose, it is possible to use, for example, the feed pressure of the cathode air supply of the fuel cell.

BRIEF DESCRIPTION OF THE DRAWINGS

As already illustrated by the above explanations, the teaching of the present invention can be advantageously embodied and refined in different ways. In this regard, reference is made to the patent claims and to the following description of several exemplary embodiments of the present invention with reference to the drawings, in which:

FIG. 3b shows the nozzle characteristic of the nozzles of the gas generation system depicted in FIG. 3a.

DETAILED DESCRIPTION

Figure 1:
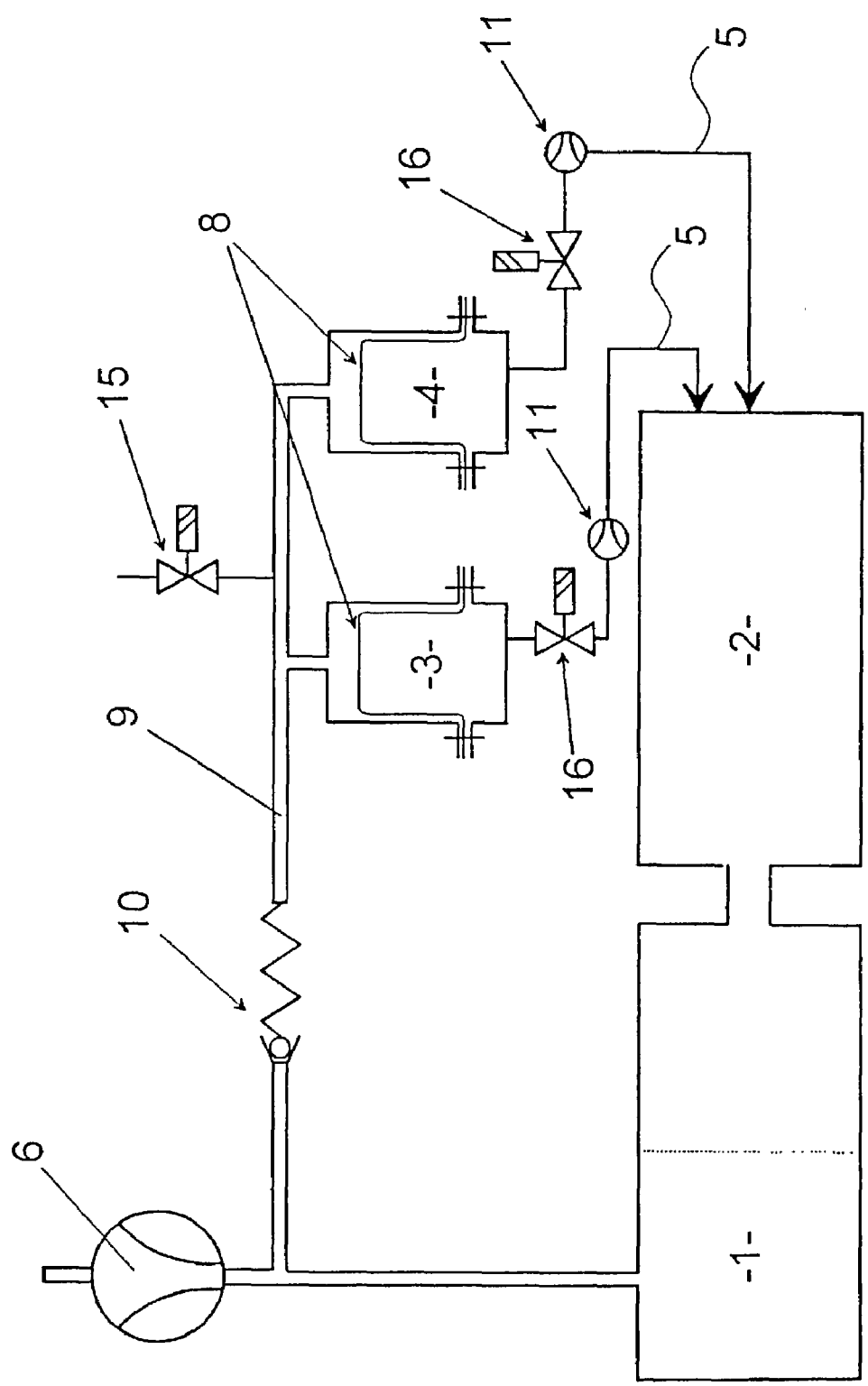
FIG. 1 shows a first variant of a gas generation system according to the present invention in conjunction with a fuel cell.

All gas generation systems shown in the drawings are connected upstream of a fuel cell 1 and used for generating hydrogen-rich gas through catalytic conversion of liquid hydrocarbons. The catalytic conversion of the hydrocarbons is carried out in several successive steps, the actual reforming, in which the hydrocarbons are broken down into $H_2$, CO and $CO_2$ in accordance with the thermodynamic equilibrium, as well as a subsequent staged shift reaction, during which CO and $H_2O$ are catalytically converted to $CO_2$ and $H_2$. Since this is irrelevant for the implementation of the gas generation system according to the present invention, all steps of the catalytic conversion are summarized in a gas generation component 2 in the Figures.

Moreover, all gas generation systems depicted in the Figures include a reservoir 3 for water and a reservoir 4 for the liquid hydrocarbons $C_nH_m$. Both water and the liquid hydrocarbons are involved in the gas generation as reactants. Reservoirs 3 and 4 are connected to gas generation component 2 via feed lines 5.

In all three exemplary embodiments, moreover, provision is made for a compressor 6 (FIG. 1) or 7 (FIGS. 2 and 3a), which can be used to pressurize reservoirs 3 and 4 or the reactants in reservoirs 3 and 4. To this end, in all three cases shown, compressor 6 or 7 delivers air as a gaseous operating medium into reservoirs 3 and 4.

Figure 2:
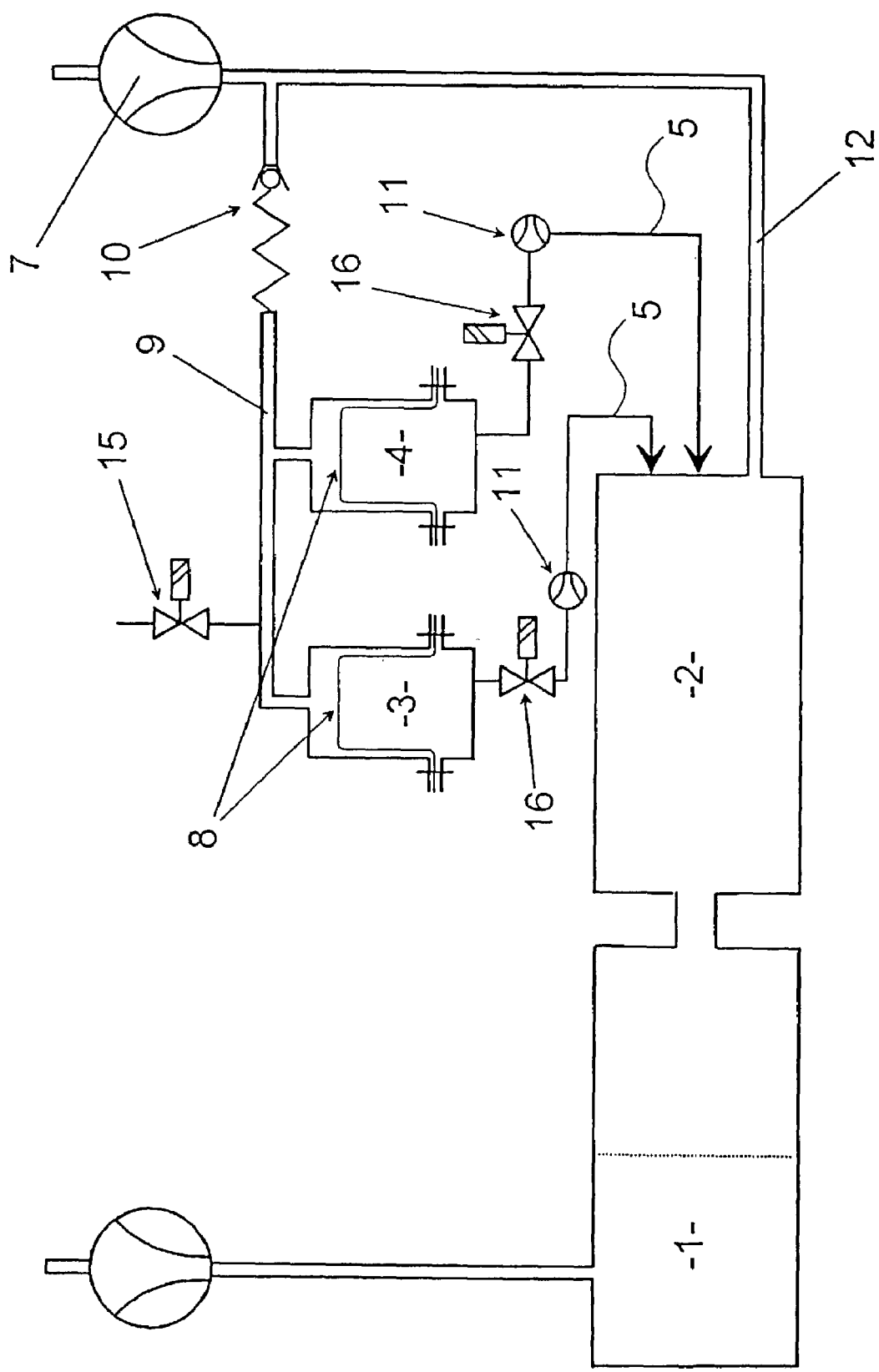
FIG. 2 shows a second variant of a gas generation system according to the present invention in conjunction with a fuel cell.
Figure 3A:
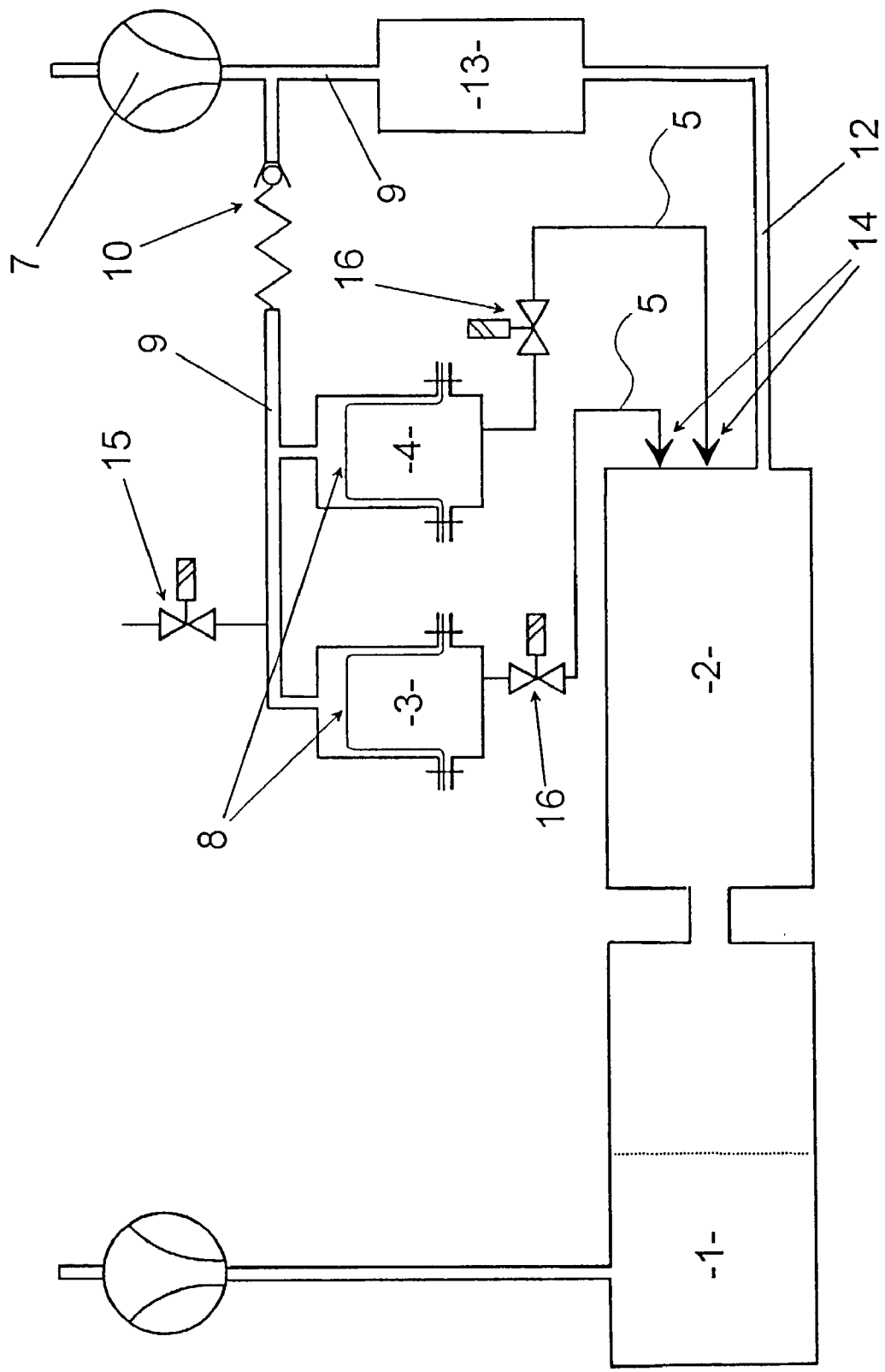
FIG. 3a shows a third variant of a gas generation system according to the present invention in conjunction with a fuel cell.

In the exemplary embodiment shown in FIG. 1, the feed pressure of the cathode air supply of fuel cell 1 is used to pressurize reservoirs 3 and 4 so that, automatically, the system pressure of fuel cell 1 builds up in reservoirs 3 and 4. In contrast to that, the compressors 7 shown in FIGS. 2 and 3a are independent of fuel cell 1 and have to be controlled in order to adjust the pressure in reservoirs 3 and 4.

In all three exemplary embodiments shown, movable separator in the form of a rolling diaphragm 8 are arranged in reservoirs 3 and 4 to prevent a gas bypass and an enrichment of the liquid reactants $H_2O$ and $C_nH_m$ with the operating medium air. Moreover, a non-return valve 10 and an emergency valve 15 for the operating medium are arranged in delivery line 9 between compressor 6 or 7 and reservoirs 3, 4. During proper operation, the pressure in reservoirs 3, 4 is maintained by non-return valve 10. In emergency cases, the pressure can be relieved through emergency valve 15.

The reactants, which are temporarily stored in reservoirs 3 and 4, are each metered via a metering element located in the respective feed line 5 between the respective reservoir 3 or 4 and gas generation component 2. In the variants of an inventive gas generation system shown in FIGS. 1 and 2, the metering elements used are metering pumps 11 which allow additional pressurization of the reactants. A shut-off valve 16 is connected upstream of each of metering pumps 11.

When the pressure present in reservoirs 3 and 4 is the same as in the downstream fuel cell, one speaks of a system pressure compensated metering of educts. In this case, even in high-pressure systems, metering pumps 11 only have to overcome the flow resistance of the individual system components which, for reasons of fluid mechanics, are designed to have a very low resistance to flow.

When a gas generation system of that kind is started, reservoirs 3, 4 are pressurized by compressor 6 or 7. As long as the pressure has not yet built up in the system, metering pumps 11 can also work without pressurization of reservoirs 3, 4. Otherwise, the metering of the reactants is carried out against the system pressure. As long as the pressure in reservoirs 3, 4 is maintained by non-return valve 10, which is positioned in the feed line, this pressure can also be used for the starting of fuel cell 1. Depending on the type of metering pumps 11 and the control thereof, both steady-state and dynamic educt metering can be implemented.

In the gas generation system shown in FIG. 2, provision is made for a further feed line 12, via which the operating medium air, which is delivered by compressor 7, is fed to gas generation component 2 as a further reactant of the gas generation.

The variant of a gas generation system according to the present invention shown in FIG. 3a is particularly suitable for steady-state use. Here, a pressure accumulator 13 for the operating medium air is connected downstream of compressor 7 so that the reactants can be pressurized via the operating medium even when compressor 7 is turned off provided that pressure accumulator 13 is under sufficient pressure. Here, compressor 7 is switched on only when the pressure in pressure accumulator 13 falls below a predetermined minimum pressure which should not be smaller than the system pressure. As soon as the pressure in pressure accumulator 13 has reached a predetermined maximum pressure, compressor 7 is turned off again.

Figure 3B:
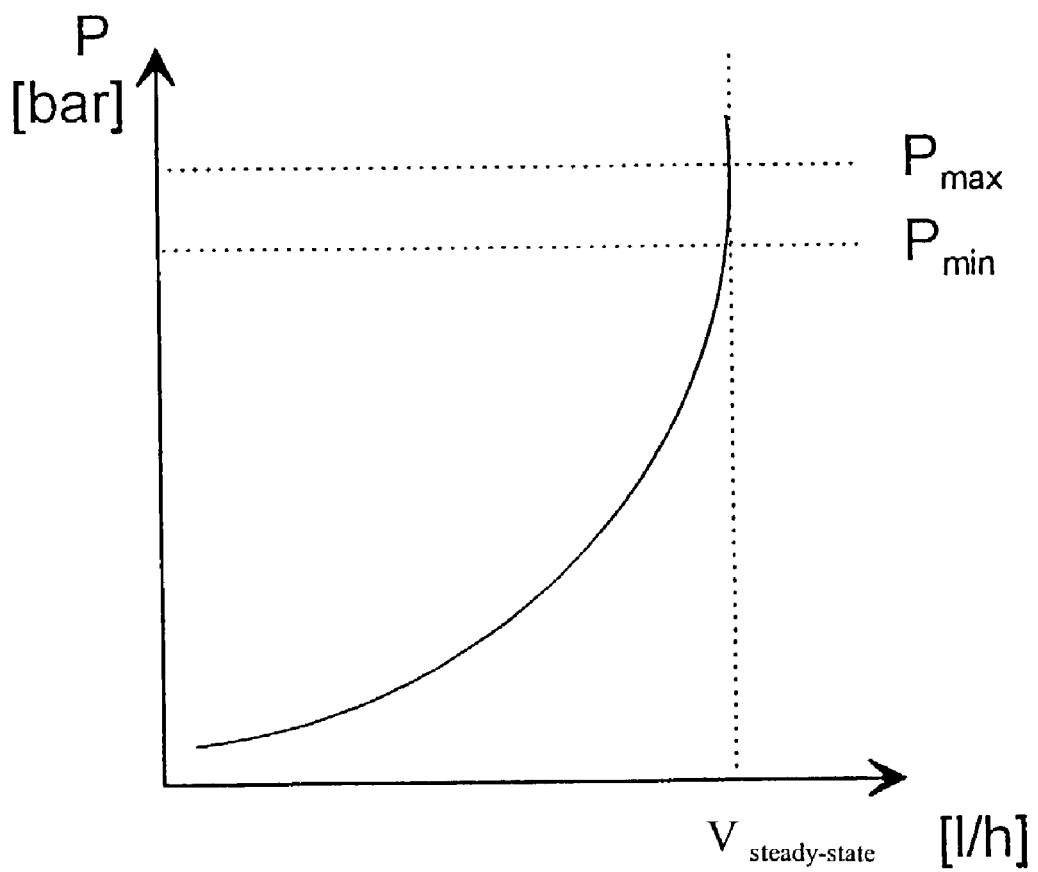

In the exemplary embodiment shown here, the reactants are metered via nozzles 14 located in feed lines 5, utilizing the pressure difference between the maximum pressure and the minimum pressure in pressure accumulator 13. To this end, nozzles 14 are designed for a relatively small throughput so that the pressure changes in the here relevant pressure range between the maximum pressure and the minimum pressure do not have any influence on the nozzle throughput. In this pressure range, the nozzle characteristic is quasi steady-state, which is illustrated in FIG. 3b. In this context, P [bar] denotes the pressure in bar; V [l/h] the volume flow in liters per hour; $P_{max}$ the pressure at which the compressor is switched off; $V_{steady\text{-}state}$ the volume flow at $P_{max}$, which, to a good approximation, corresponds to volume flow $P_{min}$ (steady-state volume flow). A nozzle design of that kind has the same effect on fuel, water and air so that, at most, minor errors are to be expected in the metering of the individual reactants. Since the pressure changes in the pressure range that is relevant here, if at all, has only minor effects on the nozzle throughput, it is also possible for pressure accumulator 13 to be filled intermittently. Upstream of nozzles 14, there is also connected a shut-off valve 16, respectively.

At this point, again, it should be explicitly noted that the metering of the reactants does not necessarily have to be carried out via nozzles even when a pressure accumulator is used to pressurize the reservoirs, as described above, but can also be accomplished, for example, using metering pumps.

What is claimed is:

1. A gas generation system, comprising:
   a reservoir for a reactant;
   a compressor configured to pressurize the reactant in the reservoir using an operating medium delivered into the reservoir;
   a gas generation component fed with the reactant using a reactant feed line;
   a metering element disposed in the reactant feed line between the reservoir and the gas generation component; and
   a pressure accumulator disposed downstream of the compressor, the pressure accumulator providing a pressurization of the reactant in the reservoir using the operating medium when the compressor is switched off.

2. The gas generation system as recited in claim 1 wherein the metering element includes a nozzle.

3. The gas generation system as recited in claim 2 wherein the nozzle enables an essentially constant volume flow throughput within a predetermined pressure range.

4. A gas generation system, comprising:
   a reservoir for a reactant;
   a compressor configured to pressurize the reactant in the reservoir using an operating medium delivered into the reservoir;
   a gas generation component fed with the reactant using a reactant feed line;
   a metering element disposed in the reactant feed line between the reservoir and the gas generation component and additionally pressurizing the reactant downstream of the metering element; and
   a second reservoir for a second reactant, the gas generation component being fed with the second reactant using a second reactant feed line, wherein the compressor is further configured to pressurize the second reactant in the second reservoir using the operating medium.

5. A gas generation system, comprising:
   a reservoir for a reactant;
   a compressor configured to pressurize the reactant in the reservoir using an operating medium delivered into the reservoir;
   a gas generation component fed with the reactant using a reactant feed line;
   a metering element disposed in the reactant feed line between the reservoir and the gas generation component and additionally pressurizing the reactant downstream of the metering element; and
   a movable separator disposed in the reservoir to separate the operating medium and the reactant.

6. The gas generation system as recited in claim 5 wherein the moveable separator includes a rolling diaphragm.

7. A gas generation system, comprising:
   a reservoir for a reactant;
   a compressor configured to pressurize the reactant in the reservoir using an operating medium delivered into the reservoir;
   a gas generation component fed with the reactant using a reactant feed line;
   a metering element disposed in the reactant feed line between the reservoir and the gas generation component and additionally pressurizing the reactant downstream of the metering element; and
   a non-return valve disposed between the compressor and the reservoir.

8. A gas generation system, comprising:
   a reservoir for a reactant;
   a compressor configured to pressurize the reactant in the reservoir using an operating medium delivered into the reservoir;
   a gas generation component fed with the reactant using a reactant feed line;
   a metering element disposed in the reactant feed line between the reservoir and the gas generation component and additionally pressurizing the reactant downstream of the metering element; and
   a first operating medium delivery line between the compressor and the reservoir and a second operating medium delivery line between the compressor and the gas generation component.

9. A gas generation system, comprising:
   a reservoir for a reactant;
   a compressor configured to pressurize the reactant in the reservoir using an operating medium delivered into the reservoir;
   a gas generation component fed with the reactant using a reactant feed line; and
   a metering element disposed in the reactant feed line between the reservoir and the gas generation component and additionally pressurizing the reactant downstream of the metering element;
   wherein the operating medium includes a gas.

10. The gas generation system as recited in claim 9, wherein the gas is an inert gas.

11. The gas generation system as recited in claim 9, wherein the gas is nitrogen.

12. The gas generation system as recited in claim 9, wherein the gas is air.

13. The gas generation system as recited in claim 12 wherein the metering element is capable of implementing steady-state metering.

14. The gas generation system as recited in claim 12 wherein the metering element is capable of implementing dynamic educt metering.

15. A method for operating a gas generation system, comprising:
   compressing an operating medium;
   delivering at least a first portion of the compressed operating medium to a reservoir so as to pressurize a reactant in the reservoir;
   controlling the delivery of the portion of compressed operating medium so as to maintain a pressure in the reservoir at a level corresponding to a pressure of the reactant downstream from the reservoir;
   metering the reactant in a feed line using a metering element between the reservoir and a gas generation component so as to additionally pressurize the reactant downstream of the metering element; and
   delivering the reactant to the gas generation component;
   wherein the gas generation component is operably connected to a fuel cell; and wherein the operating medium is a fuel cell cathode air supply, and further comprising delivering a second portion of the operating medium to the fuel cell.

16. The method for operating a gas generation system as recited in claim 15 wherein the metering element implements steady-state metering.

17. The method for operating a gas generation system as recited in claim 15 wherein the metering element implements dynamic educt metering.

* * * * *

UNITED STATES PATENT AND TRADEMARK OFFICE
CERTIFICATE OF CORRECTION

PATENT NO. : 7,220,504 B2
APPLICATION NO. : 10/274229
DATED : May 22, 2007
INVENTOR(S) : Norbert Wiesheu Page 1 of 1

It is certified that error appears in the above-identified patent and that said Letters Patent is hereby corrected as shown below:

Claim 13 in Column 6, lines 44 to 46, should read:

--13. The gas generation system as recited in claim 9 wherein the metering element is capable of implementing steady-state metering.-- instead of

"13. The gas generation system as recited in claim 12 wherein the metering element is capable of implementing steady-state metering."

Claim 14 in Column 6, lines 47 to 49, should read:

--14. The gas generation system as recited in claim 9 wherein the metering element is capable of implementing dynamic educt metering.-- instead of

"14. The gas generation system as recited in claim 12 wherein the metering element is capable of implementing dynamic educt metering."

Signed and Sealed this

Eighteenth Day of September, 2007

JON W. DUDAS
*Director of the United States Patent and Trademark Office*